(12) United States Patent
Sun et al.

(10) Patent No.: US 7,387,600 B1
(45) Date of Patent: Jun. 17, 2008

(54) TOOL SUPPORT DEVICE FOR MACHINE TOOL

(76) Inventors: Ying Sun, No. 19 Avenue 28, Lane 851, Chonsan Road, Shergan Hsiang, Taichung Hsien 42943 (TW); Chi Sun, No. 19 Avenue 28, Lane 851, Chonsan Road, Shergan Hsiang, Taichung Hsien 42943 (TW)

( * ) Notice: Subject to any disclaimer, the term of this patent is extended or adjusted under 35 U.S.C. 154(b) by 0 days.

(21) Appl. No.: 11/879,849

(22) Filed: Jul. 18, 2007

(30) Foreign Application Priority Data

May 18, 2007 (TW) ............................... 96117794 A

(51) Int. Cl.
*B23Q 3/157* (2006.01)
(52) U.S. Cl. ............................................ 483/18; 483/39
(58) Field of Classification Search .................. 483/18, 483/38, 39, 54, 55, 56, 66, 67
See application file for complete search history.

(56) References Cited

U.S. PATENT DOCUMENTS

| 4,335,498 | A | | 6/1982 | Hague et al. |
|---|---|---|---|---|
| 4,776,081 | A | | 10/1988 | Okunishi et al. |
| 4,955,127 | A | * | 9/1990 | Suda et al. ..................... 483/54 |
| 5,020,210 | A | * | 6/1991 | Fujimoto ....................... 483/54 |
| 5,134,767 | A | * | 8/1992 | Yasuda ......................... 483/56 |
| 5,499,963 | A | * | 3/1996 | Fujimoto et al. ............. 483/56 |
| 6,102,840 | A | | 8/2000 | Xiao |
| 7,150,705 | B2 | * | 12/2006 | Kojima et al. ................ 483/69 |
| 7,300,393 | B2 | * | 11/2007 | Fujimoto et al. ............. 483/56 |
| 2004/0176228 | A1 | * | 9/2004 | Kojima et al. ................ 483/67 |
| 2005/0009679 | A1 | * | 1/2005 | Fujimoto et al. ............. 483/39 |

\* cited by examiner

*Primary Examiner*—Dana Ross
(74) *Attorney, Agent, or Firm*—Charles E. Baxley

(57) ABSTRACT

A tool support device for a machine tool includes a housing disposed beside a tool spindle, a tool storage rack having a shaft rotatably attached to the housing, a plate secured to the shaft and rotatably received in the housing, a number of rollers disposed on the plate, an axle rotatably disposed in the housing and having a rotary member which includes a helical groove for engaging with the rollers and for rotating the plate and the shaft and the tool storage rack relative to the tool spindle, the tool support device includes a compact structure for suitably shielding and protecting the tool support device and for preventing the tool support device from being contaminated and damaged by dirt and cut chips.

3 Claims, 4 Drawing Sheets

TOOL SUPPORT DEVICE FOR MACHINE TOOL

BACKGROUND OF THE INVENTION

1. Field of the Invention

The present invention relates to a machine tool, and more particularly to a machine tool including an improved tool support device having a compact and shielded configuration for suitably shielding and protecting the tool support device and for preventing the tool support device from being contaminated and damaged by dirt and cut chips.

2. Description of the Prior Art

Typical machine tools comprise a tool support device having a tool storage rack for supporting various tools or tool adapters at the outer peripheral portion thereof and having a rotating or driving device for rotating the tool storage rack relative to a machine base of the machine tools.

For example, U.S. Pat. No. 4,335,498 to Hague et al. discloses one of the typical machine tools comprising a spindle assembly associated with an indexing tool storage rack on which a number of distinct tools are stored.

However, a complicated tool carrier and transport means is developed and includes a complicated sprocket-and-chain system for rotating or driving the tool storage rack to rotate relative to the machine base of the machine tools such that the manufacturing cost will be greatly increased, in addition, the complicated sprocket-and-chain system will be exposed and will be easily contaminated and damaged by dirt and cut chips.

U.S. Pat. No. 4,776,081 to Okunishi et al. discloses another typical multi-spindle head-replacing machine tool comprising a number layers or guide rails for supporting or carrying a number of multi-spindle heads, and an elevator mechanism disposed sideways from the guide rails at a place offset from the movable rail for providing replacement of the multi-spindle heads between the guide rails.

However, similarly, the complicated guide rails may have a greatly increased manufacturing cost, and the complicated guide rails may also be exposed and will be easily contaminated and damaged by dirt and cut chips.

U.S. Pat. No. 6,102,840 to Xiao discloses a further typical tool changer for a machine tool and comprising a tool storage rack or disc magazine on which a number of distinct tools are stored and retained with retainers. The typical tool changer discloses the retainers for retaining the tools on the tool storage rack or the disc magazine, but failed to disclose the rotating or driving device for rotating the tool storage rack or the disc magazine relative to the machine base of the machine tools.

The present invention has arisen to mitigate and/or obviate the afore-described disadvantages of the conventional tool support devices for the machine tools.

SUMMARY OF THE INVENTION

The primary objective of the present invention is to provide a machine tool including an improved tool support device having a compact and shielded configuration for suitably shielding and protecting the tool support device and for preventing the tool support device from being contaminated and damaged by dirt and cut chips.

In accordance with one aspect of the invention, there is provided a machine tool comprising a tool spindle assembly, a housing disposed beside the tool spindle assembly, a tool storage rack provided beside the tool spindle assembly and including a number of retainers disposed on an outer peripheral portion of the tool storage rack for attaching tool adapters, the tool storage rack including a shaft extended into the housing for rotatably attaching to the housing, a plate secured to the shaft and rotatably received in the housing and rotated in concert with the shaft for allowing the tool storage rack to be rotatably attached to the housing with the shaft, the plate including a number of rollers disposed thereon, an axle rotatably disposed in the housing and including a rotary member provided on the axle and rotated in concert with the axle, and the rotary member including a helical groove formed therein for engaging with the rollers and for rotating the plate and the shaft and the tool storage rack relative to the tool spindle assembly, and a rotating device for rotating the axle and the rotary member relative to the housing and to rotate the plate and the shaft relative to the housing.

The rotating device includes a motor having a spindle, a pinion attached to the spindle of the motor, and a gear attached to the axle and engaged with the pinion for allowing the axle to be rotated by the motor with the pinion and the gear, and for allowing the tool storage rack to be rotated by the axle and the motor with the rollers and the helical groove of the rotary member.

The rotating device includes a casing attached to the housing, the motor is attached to the casing, and the pinion and the gear are rotatably received in the casing.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
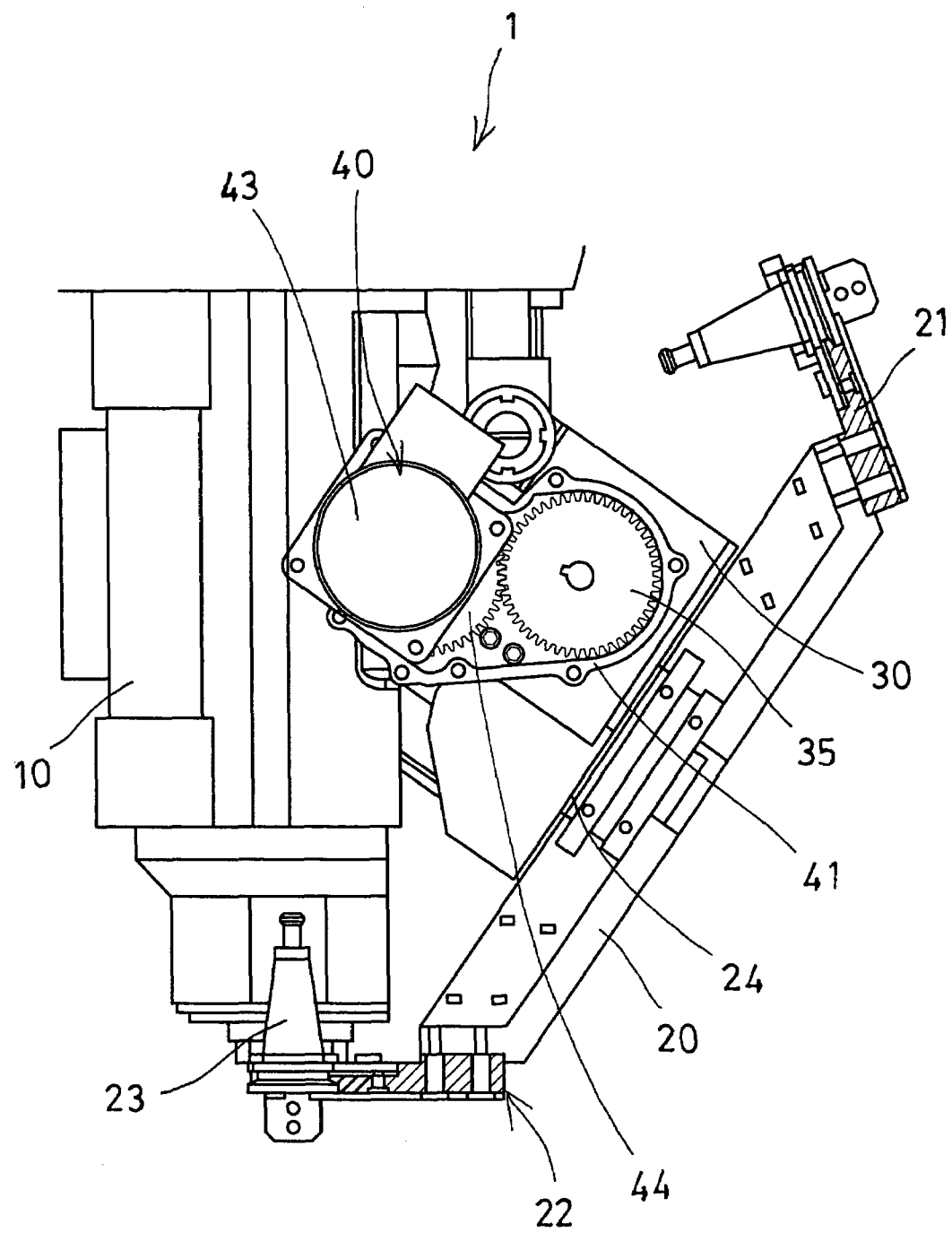
FIG. 1 is a partial front plan schematic view of a machine tool in accordance with the present invention, in which a portion of the tool storage rack or the disc magazine has been cut off for showing an inner structure of the tool storage rack or the disc magazine.
Figure 2:
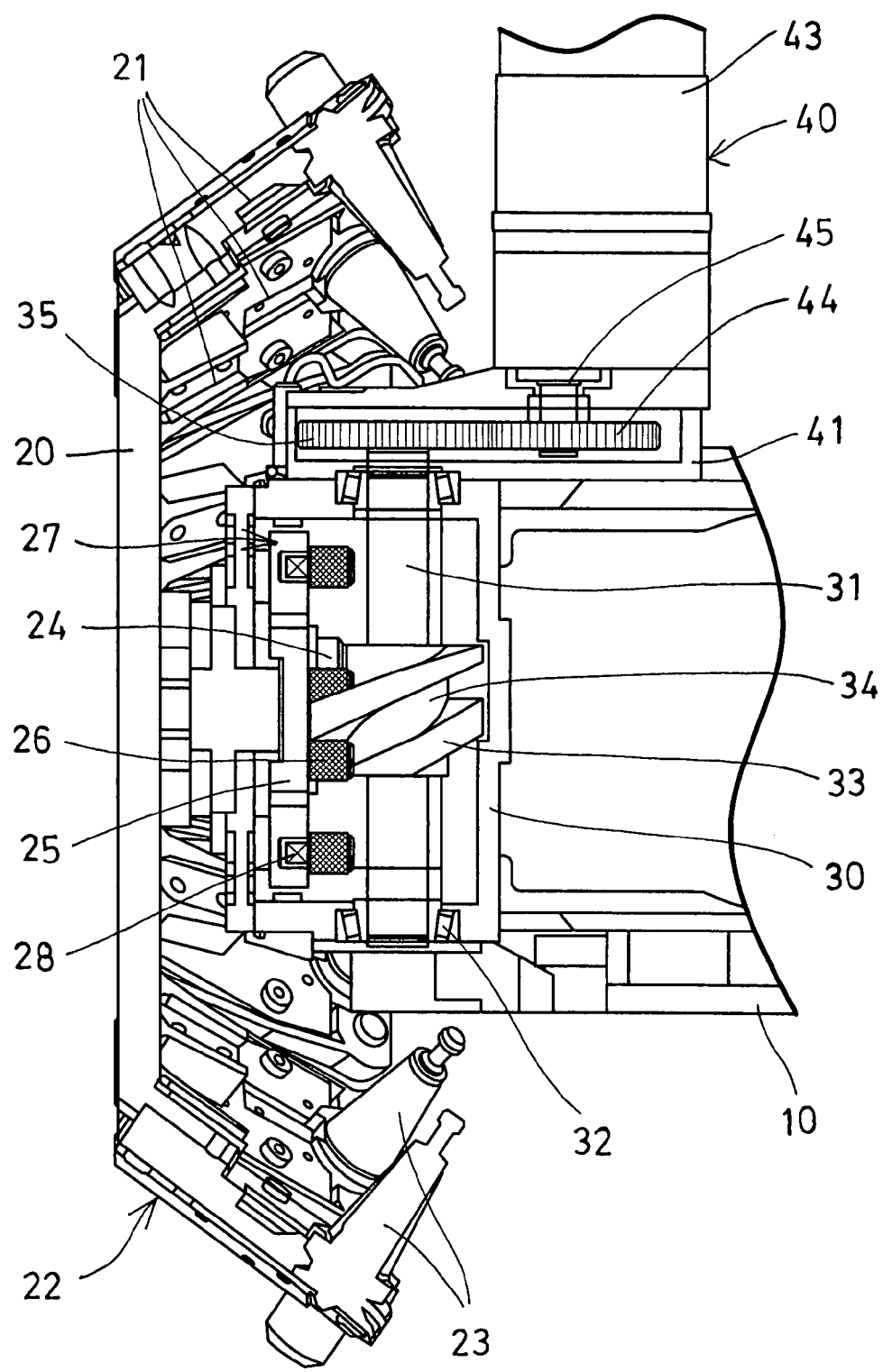
FIG. 2 is a partial side plan schematic view of the machine tool, in which a portion of the tool storage rack or the disc magazine has also been cut off for showing an inner structure of the tool storage rack or the disc magazine.
Figure 3:
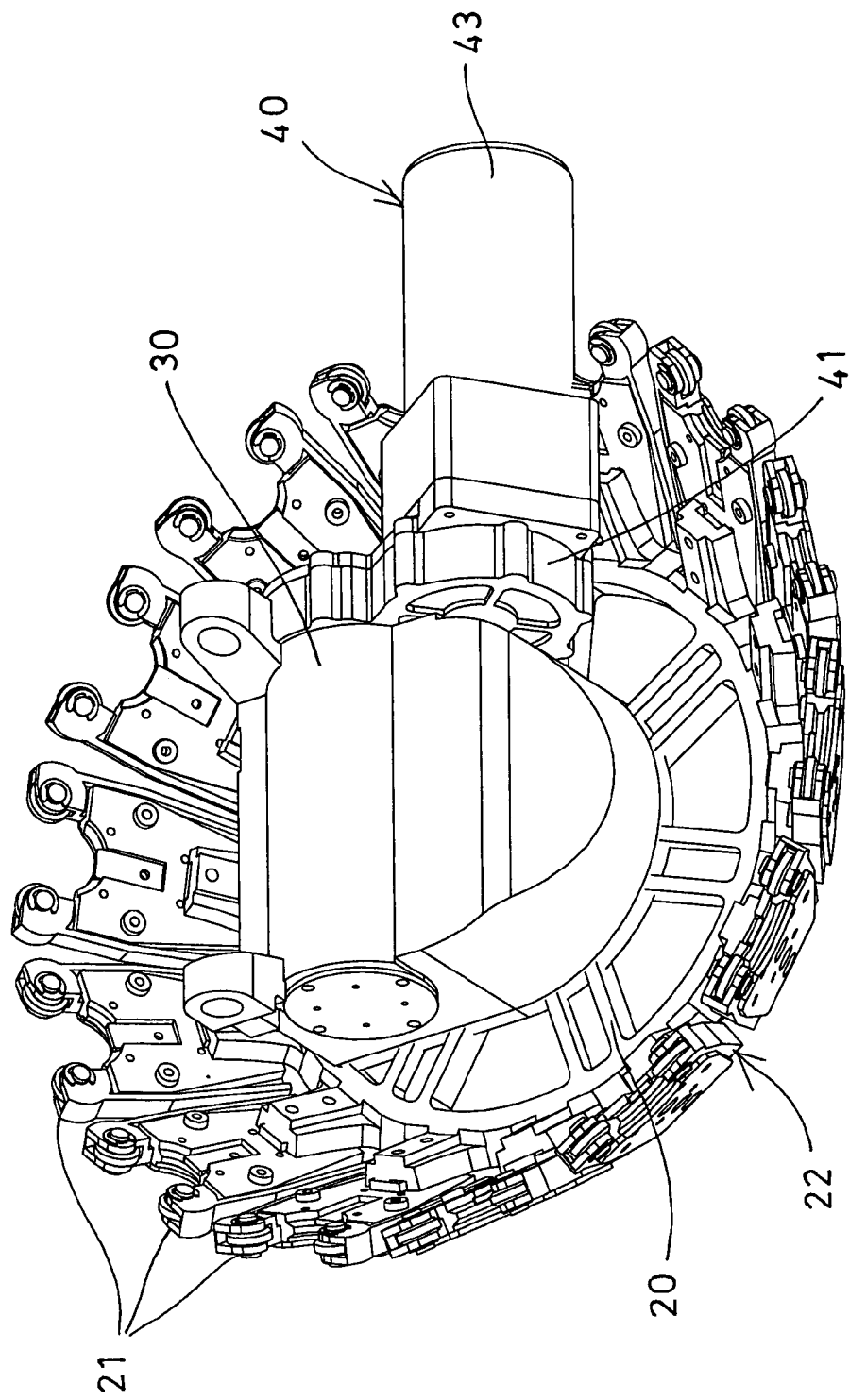
FIG. 3 is a perspective view illustrating the tool storage rack or the disc magazine and the rotating or driving device for rotating the tool storage rack or the disc magazine relative to the machine base of the machine tools.

Referring to the drawings, and initially to FIGS. 1 and 2, a machine tool 1 in accordance with the present invention comprises a tool spindle assembly 10 for attaching and driving selected tool members (not shown), and a disc magazine or tool storage rack 20 rotatably disposed or provided or supported beside the tool spindle assembly 10 and including a number of retainers 21 disposed or provided or supported on the outer peripheral portion 22 of the tool storage rack 20 for attaching or storing and/or retaining tool adapters 23 which may be used for supporting distinct tools members (not shown), and for selectively rotating and sending the tools members toward the tool spindle assembly 10 when the tool storage rack 20 is rotated relative to the tool spindle assembly 10 of the machine tool 1.

Figure 4:
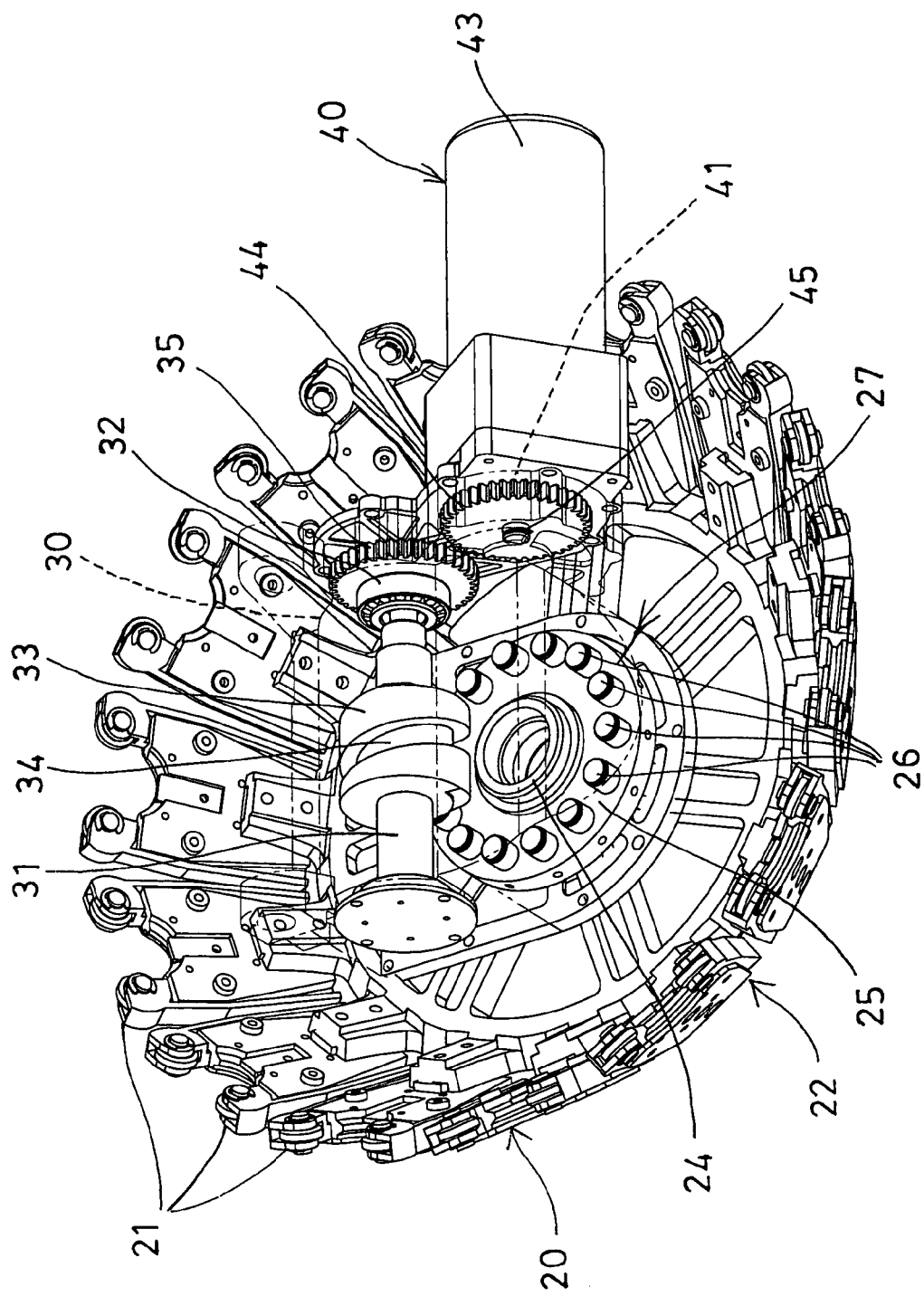
FIG. 4 is a perspective view similar to FIG. 3, illustrating the inner structure of the rotating or driving device for the machine tool.

For example, the machine tool 1 includes a receptacle or housing 30 attached or secured to a machine base (not shown) or disposed or provided or supported beside the tool spindle assembly 10 of the machine tool 1 for rotatably supporting the tool storage rack 20 and a rotating or driving means or device 40 that may be used for rotating the tool storage rack 20 relative to the machine base or the tool spindle assembly 10 of the machine tool 1. The tool storage rack 20 includes a shaft 24 extended into the housing 30 (FIGS. 1, 2, 4) for rotatably attaching or securing or coupling to the housing 30, and a plate 25 secured to the shaft 24 and rotatably received in the housing 30 and rotated in concert with the shaft 24, such that the tool storage rack 20 may be rotatably attached or secured or coupled to the housing 30 with the shaft 24 and the plate 25.

The plate 25 includes a number of wheels or rollers 26 rotatably disposed or provided or supported on the outer peripheral portion 27 of the plate 25 with pivot pins 28 (FIG. 2), and disposed or arranged around the shaft 24 and equally spaced from each other. An axle 31 is rotatably disposed or supported in the housing 30 with one or more bearings 32 (FIGS. 2, 4), and includes a worm or rotary member 33 formed or provided or secured to the axle 31 and rotated in concert with the axle 31, and the worm or rotary member 33 includes a helical groove 34 formed therein for engaging with the rollers 26 and thus for rotating or driving the plate 25 and the shaft 24 and the tool storage rack 20 to rotate relative to the machine base or the tool spindle assembly 10 of the machine tool 1 by the sliding engagement between the rollers 26 and the worm or rotary member 33.

The rotating or driving means or device 40 includes a casing 41 attached or secured or coupled to the housing 30, and a motor 43 attached or secured or coupled to the casing 41, a gear or pinion 44 attached or secured or coupled to the spindle 45 of the motor 43 and rotated by the motor 43, it is preferable that the pinion 44 is rotatably received in the casing 41, and a pinion or gear 35 is also rotatably received in the casing 41 and attached or secured to the axle 31 and rotated in concert with the axle 31, and the gear 35 is meshed or engaged with the pinion 44 for allowing the axle 31 to be rotated or driven by the motor 43 with the pinion 44 and the gear 35, and thus for allowing the tool storage rack 20 to be rotated or driven by the axle 31 and the motor 43 with the rollers 26 and the helical groove 34 of the worm or rotary member 33, such that the rotating or driving means or device 40 may be used for rotating or driving the axle 31 and the rotary member 33 to rotate relative to the housing 30.

It is to be noted that the housing 30 and the rotating or driving device 40 are disposed or arranged between the tool spindle assembly 10 and the tool storage rack 20 for forming a compact configuration, in addition, the shaft 24 and the plate 25 and the rollers 26 and the axle 31 and worm or rotary member 33 are suitably received and shielded and protected within the housing 30, and the pinion 44 and the gear 35 are suitably received and shielded and protected within the casing 41 such that the parts or elements 24-26, 31-33, 35 and 44 may be suitably shielded and protected and may be prevented from being contaminated and damaged by the dirt and the cut chips that are cut or generated by the tools members (not shown).

Accordingly, the machine tool in accordance with the present invention includes an improved tool support device having a compact and shielded configuration for suitably shielding and protecting the tool support device and for preventing the tool support device from being contaminated and damaged by dirt and cut chips.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

The invention claimed is:

1. A machine tool comprising:
   a tool spindle assembly,
   a housing disposed beside said tool spindle assembly,
   a tool storage rack provided beside said tool spindle assembly and including a plurality of retainers disposed on an outer peripheral portion of said tool storage rack for attaching tool adapters, said tool storage rack including a shaft extended into said housing for rotatably attaching to said housing,
   a plate secured to said shaft and rotatably received in said housing and rotated in concert with said shaft for allowing said tool storage rack to be rotatably attached to said housing with said shaft, said plate including a plurality of rollers disposed thereon,
   an axle rotatably disposed in said housing and including a rotary member provided on said axle and rotated in concert with said axle, and said rotary member including a helical groove formed therein for engaging with said rollers and for rotating said plate and said shaft and said tool storage rack relative to said tool spindle assembly, and
   means for rotating said axle and said rotary member relative to said housing and to rotate said plate and said shaft relative to said housing.

2. The machine tool as claimed in claim 1, wherein said rotating means includes a motor having a spindle, a pinion attached to said spindle of said motor, and a gear attached to said axle and engaged with said pinion for allowing said axle to be rotated by said motor with said pinion and said gear, and for allowing said tool storage rack to be rotated by said axle and said motor with said rollers and said helical groove of said rotary member.

3. The machine tool as claimed in claim 1, wherein said rotating means includes a casing attached to said housing, said motor is attached to said casing, and said pinion and said gear are rotatably received in said casing.

* * * * *